United States Patent
Hogger et al.

(10) Patent No.: US 9,815,496 B2
(45) Date of Patent: Nov. 14, 2017

(54) VEHICLE BODY

(71) Applicant: Bayerische Motoren Werke Aktiengesellschaft, Munich (DE)

(72) Inventors: Thomas Hogger, Otterfing (DE); Lukasz Goldyn, Munich (DE); Ferdinand Dirschmid, Ottobrunn (DE); Thomas Weiss, Feldafing (DE); Mihaly Gonda, Unterschleissheim (DE); Anja Danne, Munich (DE); Marco Reisboeck, Munich (DE); Sabine Ullrich, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 36 days.

(21) Appl. No.: 14/985,505

(22) Filed: Dec. 31, 2015

(65) Prior Publication Data

US 2016/0107693 A1    Apr. 21, 2016

Related U.S. Application Data

(63) Continuation of application No. PCT/EP2014/064096, filed on Jul. 2, 2014.

(30) Foreign Application Priority Data

Jul. 4, 2013  (DE) .................. 10 2013 213 112

(51) Int. Cl.
    *B62D 21/03*    (2006.01)
    *B62D 25/02*    (2006.01)
    (Continued)

(52) U.S. Cl.
    CPC .......... *B62D 21/03* (2013.01); *B62D 25/025* (2013.01); *B62D 25/2036* (2013.01); *B62D 29/002* (2013.01)

(58) Field of Classification Search
    CPC .. B62D 21/03; B62D 25/025; B62D 25/2036; B62D 29/002
    (Continued)

(56) References Cited

U.S. PATENT DOCUMENTS 4,148,505 A    4/1979    Jensen et al.
4,231,607 A    11/1980   Bohlin
(Continued)

FOREIGN PATENT DOCUMENTS

DE    28 16 318 C2    5/1987
DE    43 26 270 C2    1/2003
(Continued)

OTHER PUBLICATIONS

International Search Report (PCT/ISA/210) issued in PCT Application No. PCT/EP2014/064096 dated Sep. 29, 2014 with English-language translation (six (6) pages).
(Continued)

*Primary Examiner* — Jason S Morrow
(74) *Attorney, Agent, or Firm* — Crowell & Moring LLP

(57) ABSTRACT

A vehicle body, preferably for a motor vehicle with four wheels, includes two side members extending in the longitudinal direction of the vehicle, at least one support, which extends in the vehicle transverse direction between the two side members, and at least one molded foam part that reinforces the vehicle body. The foam part is arranged in a lateral structure of the vehicle body at the height level of the support.

19 Claims, 4 Drawing Sheets

(51) Int. Cl.
*B62D 25/20* (2006.01)
*B62D 29/00* (2006.01)

(58) Field of Classification Search
USPC .............. 296/187.02, 187.12, 193.02, 146.6
See application file for complete search history.

(56) References Cited

U.S. PATENT DOCUMENTS

| | | | | | |
|---|---|---|---|---|---|
| 5,580,119 | A | * | 12/1996 | Uchida | B60J 5/0425 296/146.6 |
| 5,806,919 | A | * | 9/1998 | Davies | B62D 29/002 296/187.02 |
| 6,135,542 | A | * | 10/2000 | Emmelmann | B62D 21/09 296/187.02 |
| 6,207,244 | B1 | * | 3/2001 | Hesch | B60J 5/042 280/751 |
| 6,286,896 | B1 | * | 9/2001 | Eipper | B62D 25/087 296/187.03 |
| 6,305,136 | B1 | * | 10/2001 | Hopton | B29C 44/18 296/146.6 |
| 6,357,819 | B1 | * | 3/2002 | Yoshino | B29C 44/18 296/187.02 |
| 6,378,933 | B1 | * | 4/2002 | Schoen | B62D 29/002 296/187.02 |
| 6,455,146 | B1 | * | 9/2002 | Fitzgerald | B32B 3/00 156/83 |
| 6,851,740 | B1 | * | 2/2005 | Peng | B62D 21/157 296/187.02 |
| 7,287,797 | B1 | * | 10/2007 | Belloso | B62D 21/03 296/181.2 |
| 2002/0033617 | A1 | * | 3/2002 | Blank | B62D 21/157 296/187.02 |
| 2009/0278380 | A1 | * | 11/2009 | Bhattacharjee | B60J 5/0451 296/146.6 |
| 2011/0148152 | A1 | * | 6/2011 | Mildner | B62D 25/025 296/204 |
| 2011/0274910 | A1 | * | 11/2011 | Kraushaar | B62D 21/15 428/304.4 |
| 2013/0214558 | A1 | * | 8/2013 | Lohmann | B62D 25/025 296/187.08 |
| 2015/0258956 | A1 | * | 9/2015 | Sassi | B60R 21/0136 701/45 |
| 2015/0360733 | A1 | * | 12/2015 | Nagwanshi | B62D 29/004 180/311 |

FOREIGN PATENT DOCUMENTS

| | | |
|---|---|---|
| DE | 10 2004 024 860 A1 | 12/2005 |
| DE | 10 2006 055 560 A1 | 5/2008 |
| EP | 0 618 128 A1 | 10/1994 |
| EP | 1 762 466 A1 | 3/2007 |
| EP | 2 019 027 A1 | 1/2009 |
| GB | 2 280 647 A | 2/1995 |
| KR | 0142927 B1 | 8/1998 |

OTHER PUBLICATIONS

German Search Report issued in counterpart German Application No. 10 2013 213 112.7 dated Mar. 10, 2014 with partial English-language translation (ten (10) pages).

* cited by examiner

VEHICLE BODY

CROSS REFERENCE TO RELATED APPLICATIONS

This application is a continuation of PCT International Application No. PCT/EP2014/064096, filed Jul. 2, 2014, which claims priority under 35 U.S.C. §119 from German Patent Application No. 10 2013 213 112.7, filed Jul. 4, 2013, the entire disclosures of which are herein expressly incorporated by reference.

BACKGROUND AND SUMMARY OF THE INVENTION

The present invention relates to a vehicle body as well as to a vehicle having the vehicle body. In particular, the described vehicle body is used for a motor vehicle having four wheels.

With respect to the construction of a vehicle body, different crash events have to be taken into account. In the case of a side impact, it is important for the vehicle body to react relatively stiffly, so that most of the energy is reduced in the bumper system of the other party involved in the crash.

It is an object of the present invention to provide a vehicle body which, while its production is cost-effective, has a light construction and is also sufficiently stable, particularly with respect to a side impact.

This and other objects are achieved by a vehicle body which includes two side members extending in the longitudinal direction of the vehicle and at least one support. The support extends between the two side members in the transverse direction and, therefore, parallel to a horizontal line. The vehicle body is used particularly for motor vehicles having four wheels. According to the invention, at least one molded foam component made of rigid foam is provided, which reinforces the vehicle body and is arranged in a side structure of the vehicle body at the level of the support. In particular, at least one of these molded foam components is situated on both lateral sides of the vehicle.

By means of the at least one molded foam component, the vehicle body is reinforced in the transverse direction of the vehicle. As a result, it is achieved that, in the event of a side impact, most of the energy is dissipated in the other party involved in the crash. The use of foam permits a highly flexible construction because a corresponding molded foam component can be produced for almost all hollow spaces. The foam simultaneously has a relatively light weight, so that the rigidity of the vehicle body can be increased without any significant increases in weight.

According to an aspect of the invention, in addition to the molded foam component, a part of the side member and a part of the support are filled with a hardened foam.

Viewed in the transverse direction of the vehicle, the parts with the foam and the molded foam component are preferably aligned. This results in a path of force through the molded foam component, the foam in the side member and the foam in the support.

Furthermore, it is provided that at least one of the side members has several profiles, the profiles being filled at the level of the support at least partially with hardened foam. For this purpose, particularly the foam is injected or poured into the side member and is then hardened. An area of the respective side member is aligned with the support in the transverse direction of the vehicle. It is this area that is preferably filled with foam, so that, in the event of a side impact, the path of the force leads through the foam-filled area in the side member directly into the support. In particular, the side member has a tube-shaped design. The term "tube-shaped" applies to vehicle body structures having many different cross-sections, which may have a one-piece as well as a multi-shell construction.

As an alternative or in addition, it is provided that the support is designed as a profile and is particularly further developed in a tube-shaped manner. Preferably, the support is at least partially filled with a hardened foam. The support is reinforced by means of this foam. The thus reinforced support permits a highly rigid vehicle body in the transverse direction of the vehicle.

It is preferably provided that the at least one molded foam component is arranged in a door of the vehicle body.

It is to also contemplated to arrange several of the molded foam components in different positions on a vehicle side.

The use of foam in the support and or in the side members makes it possible to obtain a highly flexible construction because foam can be injected into almost all hollow spaces.

Therefore, two areas filled with foam and one molded foam component respectively are preferably situated on both sides of the vehicle. The molded foam component, the area of the side member filled with foam and the area of the support filled with foam are aligned when viewed in the transverse direction of the vehicle. This permits a continuous path of force from the molded foam component by way of the side member into the support.

The two face-side ends of the support preferably each rest against an interior side of the side member, so that no free spaces are created here which could be deformed in the event of a side impact.

Furthermore, it is preferably provided that the foam in the support extends to the face-side ends of the support. The area of the support directly adjoining the side member is thereby filled with foam. It is contemplated that the support is not filled with foam in the center area of the vehicle.

The support is preferably situated higher than the floor pan of the vehicle body. In particular, the entire support is arranged higher than the floor pan. The support preferably extends under a rear seat bench. Other parties involved in the crash which have a relatively high bumper, such as small trucks or pick-ups, will impact the vehicle body at a location significantly above the floor pan in the event of a side crash. It is therefore preferably provided that the support filled at least partially with foam is arranged above the floor pan, so that the path of force extends as high as possible from the other party involved in a crash into the support.

It is particularly provided that the support is the so-called "heel plate" of the vehicle body. This heel plate is a support which extends significantly higher than the floor pan in the transverse direction of the vehicle. The term "heel plate" is used according to conventional technical specifications. However, within the scope of the invention, it is provided that the heel plate is to be produced of a metal, for example, in a shell construction, as well as of a fiber-reinforced plastic material.

Thus, it is preferably provided that the at least one support, thus particularly the heel plate, and/or the side members are manufactured of a fiber-reinforced plastic material or as a sheet metal shell construction. In this case, it is also provided that some parts of the vehicle body are produced as a sheet metal shell construction and other components are produced of a fiber-reinforced plastic material. Particularly a glass-fiber-reinforced plastic material or carbon-fiber-reinforced plastic material is used as the fiber-reinforced plastic material.

The foam in the support and/or in the side member and/or the molded foam component is preferably produced of expanded polypropylene (EPP) or polyurethane (PU). In this case, it is also provided that the foam filling in the support or in the side member or the molded form component consists of different materials.

The invention further includes a vehicle having one of the above-described vehicle bodies.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, an embodiment of a vehicle body 1 will be described by means of FIGS. 1 to 4.

Figure 1:
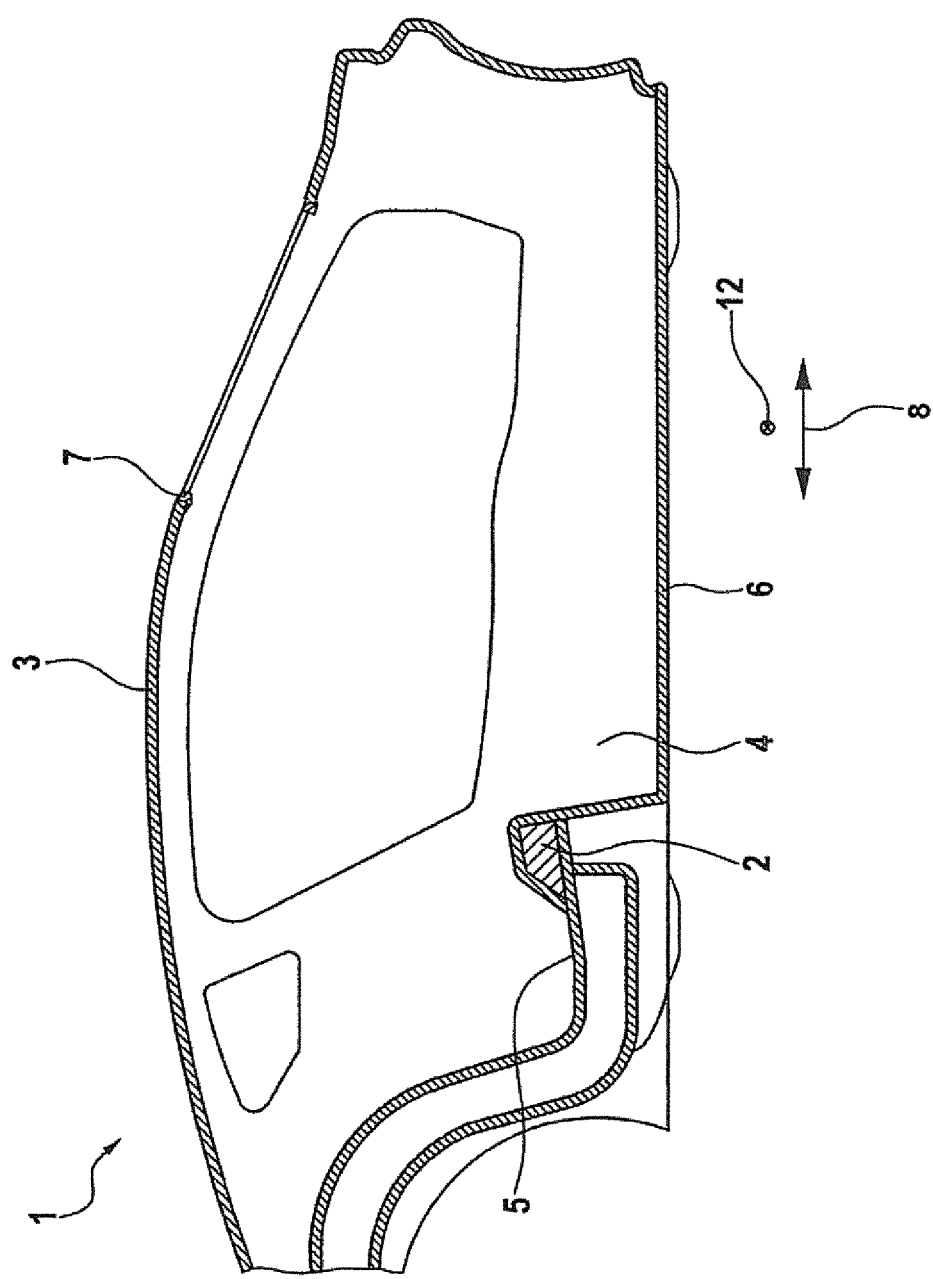
FIG. 1 is a sectional lateral view of a vehicle body of the invention according to an embodiment.
Figure 2:
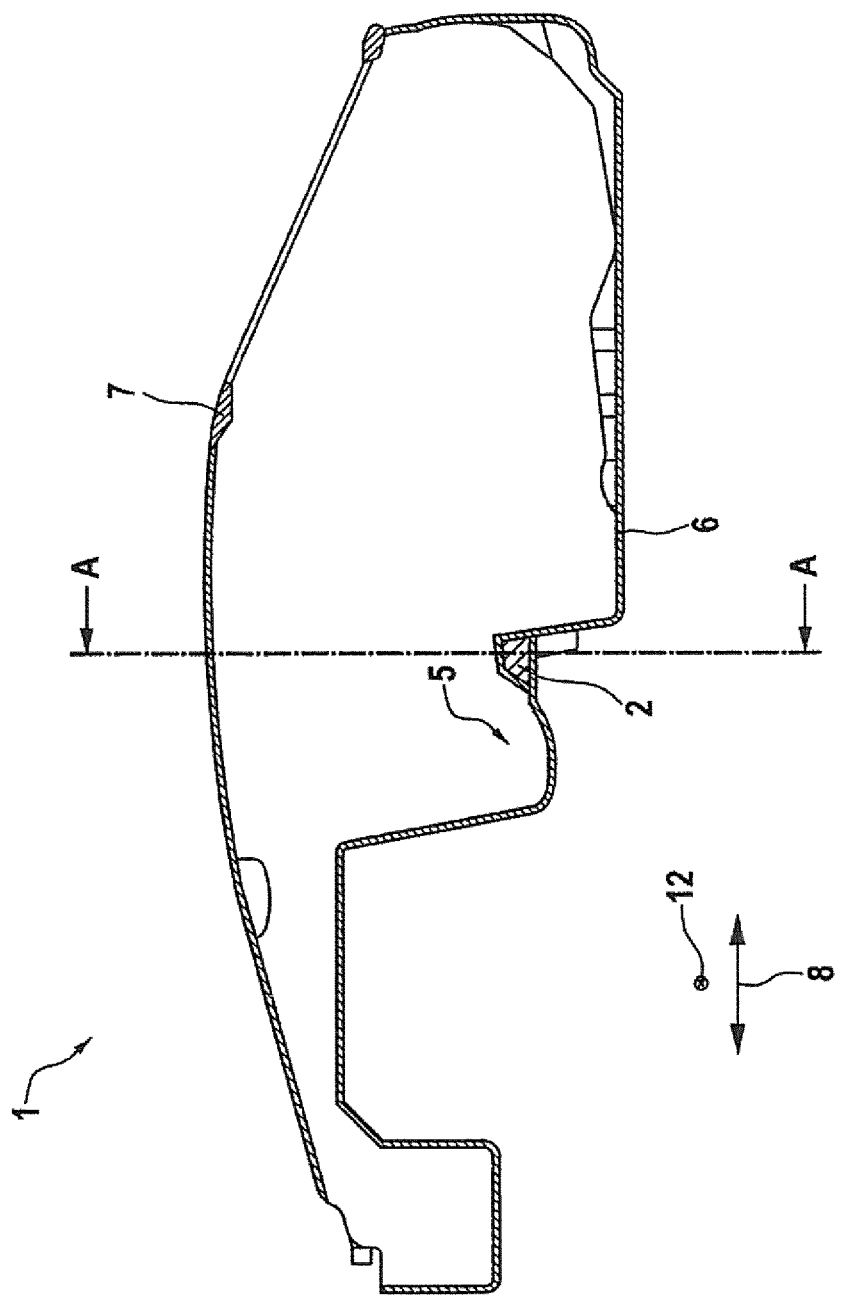
FIG. 2 is a schematically simplified, sectional lateral view of the vehicle body of the invention according to the embodiment.

FIG. 1 is a sectional lateral view of the vehicle body 1. FIG. 2 illustrates the sectional view in a schematically simplified manner. A longitudinal direction 8 of the vehicle is defined. The longitudinal direction 8 of the vehicle corresponds to the traveling direction of the respective vehicle. A transverse direction 12 (see FIG. 4) of the vehicle extends perpendicularly to the longitudinal direction 8 of the vehicle.

The vehicle body 1 includes a support 2 which extends in the transverse direction 12 of the vehicle. Further, a roof frame 3, a windshield frame 7 and a side frame 4 are provided. A recess 5 for receiving a rear seat bench is situated behind the support 2 viewed in the longitudinal direction 8 of the vehicle. The vehicle body 1 is closed off on the bottom by a floor pan 6.

Figure 3:
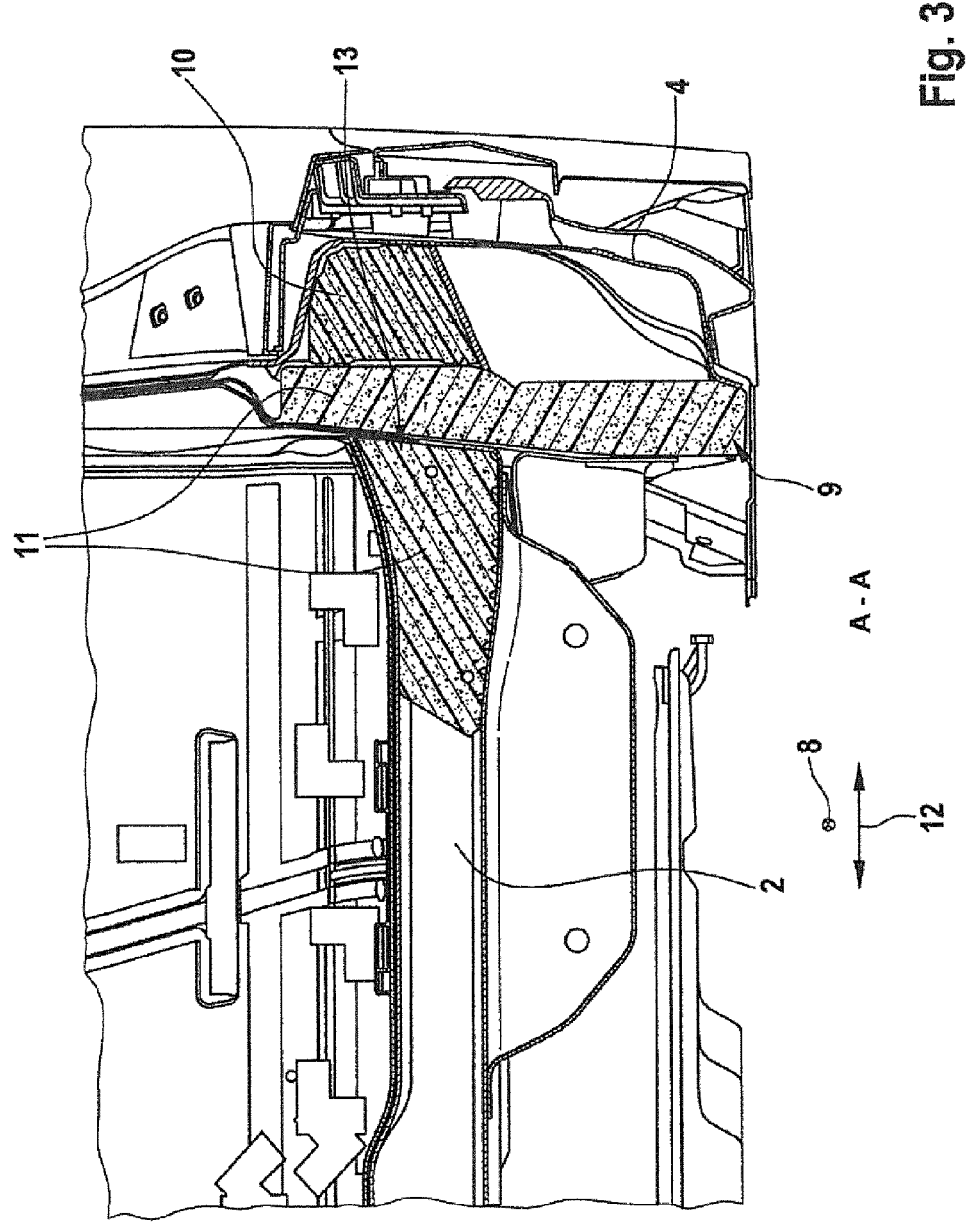
FIG. 3 is the sectional view taken along line A-A marked in FIG. 2.

In FIG. 2, a sectional view is marked A-A. FIG. 3 is the corresponding sectional view. FIG. 3 illustrates a side member 9 as an additional component of the vehicle body 1. It is understood that one side member 9 respectively extends on both sides of the vehicle body 1. A molded foam component 10 is arranged in the vehicle body 1 laterally outside the respective side member. The molded foam component 10 is situated in the clearance between the exterior side of the respective side member 9 and the lateral frame 4 of the vehicle body 1.

In addition, the sectional view A-A in FIG. 3 indicates that the face-side ends 13 of the support 2 rest against the interior side of the respective side member 9.

Figure 4:
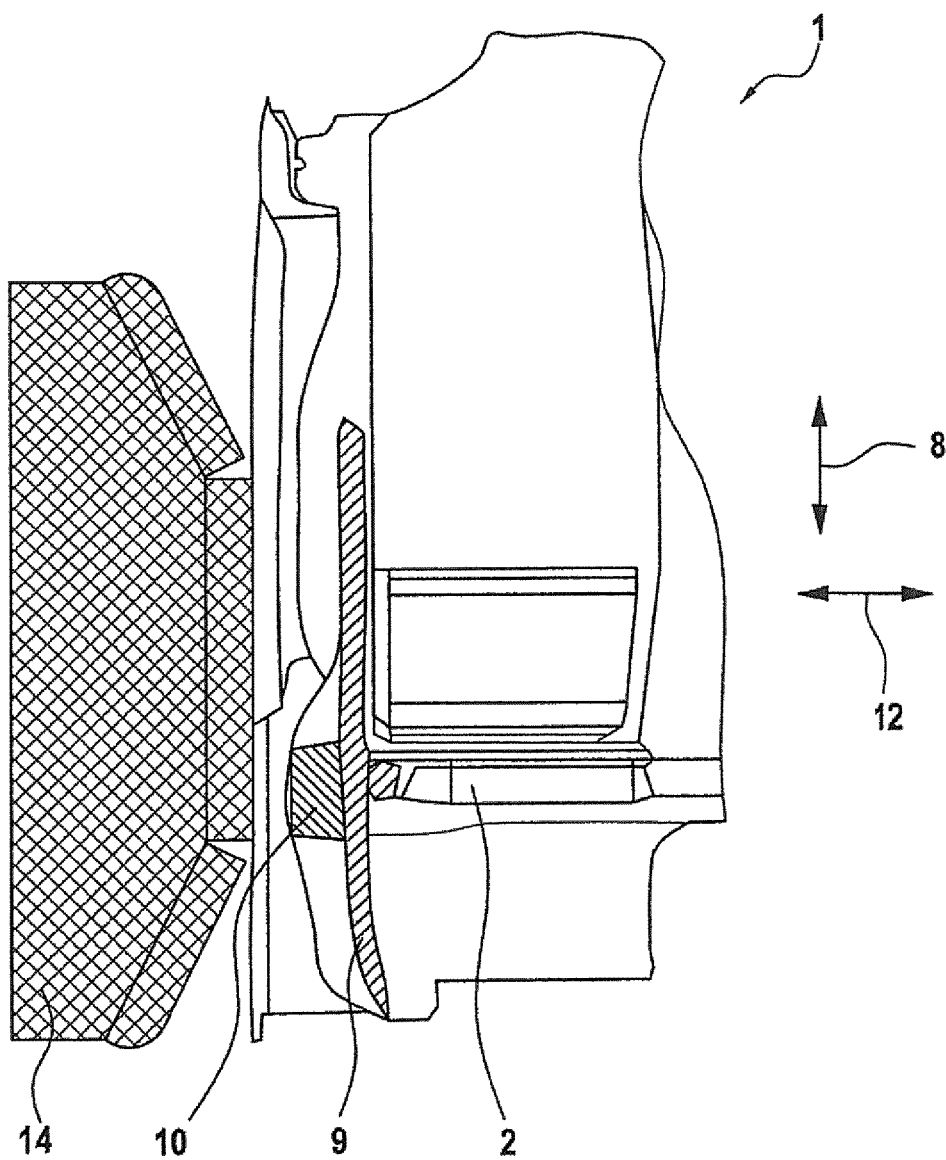
FIG. 4 is a sectional top view of the vehicle body of the invention according to the embodiment.

The support 2 is the so-called "heel plate" in the vehicle body 1. This heel plate is situated far above the floor panel 6. In the event of a lateral crash, the other party 14 involved in the crash, which is illustrated in FIG. 4, will impact the vehicle body 1 approximately at the level of the support 2 constructed as the heel plate. In particular, the other party 14 involved in the crash has a relatively high bumper system. Particularly in this crash case, it is desirable that the vehicle body is deformed as little as possible and the crash energy is dissipated in the other party 14 involved in the crash. It is therefore provided that, in addition to the molded foam component 10, one part of the side member 9 and one part of the support 2 are completely filled with a hardened foam 11. As illustrated particularly in FIG. 3, the parts with the foam 11 and the molded foam component 10 are substantially aligned when viewed in the transverse direction of the vehicle 1. This results in a force path through the molded foam component 10, the foam 11 in the side member 9 and the foam 11 in the support 2.

The foams 11 and the molded foam component 10 are preferably produced of PU foam or EPP foam. Either the sheet metal shell construction or a fiber-reinforced plastic material are selected for the different components of the vehicle body 1. As a result of the reinforcement of the support 2 and of the side member 9 by way of the foam 11, usage of a fiber-reinforced plastic material can be used very well here, because the rigid further development prevents a breaking of the fiber-reinforced plastic parts.

LIST OF REFERENCE NUMBERS

1 Vehicle body
2 Support (heel plate)
3 Roof frame
4 Side frame
5 Recess for rear seat bench
6 Floor pan
7 Windshield frame
8 Longitudinal direction of the vehicle
9 Side member
10 Molded foam component
11 Hardened foam
12 Transverse direction of the vehicle
13 Face-side ends
14 Other party involved in the crash The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body for a motor vehicle, comprising:
   two side members extending in a longitudinal direction of the vehicle;
   at least one support extending in a transverse direction of the vehicle between the two sides members; and
   at least one molded foam component that reinforces the vehicle body, the molded foam component being arranged laterally outside of a respective side member with respect to a transverse direction of the vehicle in a lateral structure of the vehicle body at a level of the support, wherein
   a hardened foam completely fills a part of the side member and a part of the support.

2. The vehicle body according to claim 1, wherein
   viewed in the transverse direction of the vehicle, the part of the side member and the part of the support filled with the hardened foam, and the molded foam component, are aligned to provide a path of force through the molded foam component, the foam in the side member and the foam in the support.

3. The vehicle body according to claim 1, wherein the at least one molded foam component is arranged in a door of the vehicle body.

4. The vehicle body according to claim 1, wherein each face-side end of the support rests against an interior side of a respective one of the two side members.

5. The vehicle body according to claim 4, wherein the hardened foam in the support extends to the face-side ends.

6. The vehicle body according to claim 1, wherein the support is arranged higher than a floor pan of the vehicle body.

7. The vehicle body according to claim 6, wherein the support extends under a rear seat bench of the motor vehicle.

8. The vehicle body according to claim 1, wherein the support is constructed as a heel plate of the motor vehicle.

9. The vehicle body according to claim 1, wherein the support and/or the two side members are produced of fiber-reinforced plastic material or as a sheet metal shell construction.

10. The vehicle body according to claim 9, wherein the hardened foam and/or the molded foam component are produced of expanded polypropylene or polyurethane.

11. The vehicle body according to claim 1, wherein the hardened foam and/or the molded foam component are produced of expanded polypropylene or polyurethane.

12. A vehicle body for a motor vehicle, comprising:
two side members extending in a longitudinal direction of the motor vehicle;
at least one support extending in a transverse direction of the motor vehicle between the two side members; and
at least one molded foam component that reinforces the vehicle body, the at least one molded foam component being arranged laterally outside of a respective side member with respect to a transverse direction of the vehicle in a lateral structure of the vehicle body at a level of the support, wherein
at least one of the two side members comprises several profiles, at the level of the support, the profiles are at least partially filled with hardened foam, and/or
the support forms a profile and is at least partially filled with hardened foam.

13. The vehicle body according to claim 12, wherein the at least one molded foam component is arranged in a door of the vehicle body.

14. The vehicle body according to claim 12, wherein each face-side end of the support rests against an interior side of a respective one of the two side members.

15. The vehicle body according to claim 14, wherein the hardened foam in the support extends to the face-side ends.

16. The vehicle body according to claim 12, wherein the support is arranged higher than a floor pan of the vehicle body.

17. The vehicle body according to claim 12, wherein the support is constructed as a heel plate of the motor vehicle.

18. The vehicle body according to claim 12, wherein the support and/or the two side members are produced of fiber-reinforced plastic material or as a sheet metal shell construction.

19. A vehicle, comprising:
a vehicle body, comprising:
two side members extending in a longitudinal direction of the vehicle;
at least one support extending in a transverse direction of the vehicle between the two sides members; and
at least one molded foam component that reinforces the vehicle body, the molded foam component being arranged laterally outside of a respective side member with respect to a transverse direction of the vehicle in a lateral structure of the vehicle body at a level of the support, wherein
a hardened foam completely fills a part of the side member and a part of the support.

* * * * *